United States Patent Office 3,105,755
Patented Oct. 1, 1963

3,105,755
METHOD FOR OBTAINING MORE ECONOMICAL EXTRACTION OF THE VALUABLE CONSTITUENTS OF THOSE MINERALS WHICH CONTAIN IRON AT LOWER STATES OF OXIDATION THAN $Fe_2O_3$ IN THEIR MOLECULAR STRUCTURES
George E. Green, Baguio, Republic of the Philippines, assignor to Haalmer Corporation, Dover, Del., a corporation of Delaware
No Drawing. Filed June 18, 1959, Ser. No. 821,090
4 Claims. (Cl. 75—1)

This invention relates to the decomposition, partial or complete, of those minerals which contain iron at lower states of oxidation than $Fe_2O_3$ in their molecular structure and has for its objects the provision of procedures to obtain more economical and/or more selective decomposition of such minerals.

In many minerals, iron is present as an inherent component of the molecule, usually as ferrous oxide, FeO. In some cases, as in ilmenite, $FeO \cdot TiO_2$, the iron is present as an FeO radical and is in definite proportion to the other radical which in this instance is $TiO_2$. Titanium dioxide has considerable value, much greater than that of the iron associated with it, but the combined mineral, ilmenite or $FeO \cdot TiO_2$ has a relatively low value because of the hitherto expensive procedures necessary to effect decomposition and separation of the iron from the titanium.

Another mineral of this class is chromite, $FeO \cdot Cr_2O_3$. Pure chromite would theoretically be composed of 68% chromic oxide and 32% ferrous oxide, but pure chromite is not found in nature. In all natural deposits, some replacement of iron and chromium by aluminum and magnesium has taken place. Chromite for metallurgical use is usually required to have a Cr:Fe ratio of 3:1 or higher and chromite deposits with this Cr:Fe ratio do not exist in the industrialized countries where metallurgical grade chromite is most in demand. The value of chromite in which the Cr:Fe ratio exceeds 3:1 is far greater than the value of chromite in which the Cr:Fe ratio is less than 3:1, but since chromite is one of the most refractory of all natural minerals, previous attempts to alter the inherent Cr:Fe ratio have proved uneconomical.

The tungsten minerals ferberite $$FeWO_4 \text{ (or } FeO \cdot WO_3)$$

and wolframite $(Fe, Mn)WO_4$ or $(FeO, MnO)WO_3$, are two minerals which come into the above class. The value of the contained $WO_3$, per pound increases markedly as the grade of tungsten concentrate increases, but attempts hitherto to obtain partial decomposition of the natural mineral in order to up-grade the $WO_3$ content by extraction or partial extraction of the iron inherently contained in the molecule have not been economically satisfactory.

Certain beryllium minerals, such as danalite, $3(Fe, Zn, Mn)O \cdot 3BeO \cdot 3SiO_2(Fe, Zn)S$, gadolinite, $$2BeO \cdot FeO \cdot 2Y_2O_3 \cdot 3SiO_2$$

and helvite, $3(Fe, Mn)O \cdot MnS, 3BeO \cdot 3SiO_2$, contain important amounts of beryllium, and, in the case of gadolinite, other valuable elements, but these minerals are quite refractory and have not been hitherto susceptible to decomposition by economically satisfactory methods.

There are certain nickel and/or cobalt bearing minerals such as lusakite, a cobalt-nickel aluminum silicate, $4(Fe, Co, Ni, Mg)O \cdot 9(FeAl)_2O_3 \cdot 8SiO_2 \cdot H_2O$, that contain important amounts of cobalt and/or nickel yet have not been profitably exploitable heretofore since they were not amenable to economic attack by the usual treatment methods. This invention applies to such cobalt-nickel minerals when FeO is present as a part of the molecular structure as it is in lusakite.

Lithium is an element which has been of considerable recent interest. Certain minerals which contain important quantities of lithium as cryophyllite, $$3(Li, K)_2O \cdot 2FeO \cdot 4Al_2O_3 \cdot 20SiO_2 \cdot 3H_2O \cdot 8(LiK)F$$

and lesser amounts of lithium such as proto-lithionite, $K_2O \cdot Li_2O \cdot 2Al_2O_3 \cdot 3FeO \cdot 6SiO_2 \cdot 2H_2O$, and zinnwaldite, $K_2O \cdot Li_2O \cdot 2Fe \cdot 2Al_2O_3 \cdot 6Si_2O_2 \cdot H_2O$, have not been used, to any great extent, as a source of lithium because of the cost of separation of the lithium from the other elements present. The presence of the FeO radical in these minerals place them in the class to which this invention is applicable.

The rare earths occur in a large number of minerals which occur at many places around the world. The rare earths have acquired their name because of their rarity in the extracted state, not because of any rarity in mineral occurrence. The apparent rarity of these elements stems from the exceedingly costly methods hitherto necessary for their extraction from the natural minerals, which cost, in turn, has worked against the development of wider uses for the elements in the rare earth group. Columbium, tantalum, thorium and uranium are four other elements which occur in more minerals than have been used as a source of production. These four elements, which are strategically very important, could be recovered from more sources if the extraction cost could be made considerably less than that entailed in processes hitherto employed. All such minerals which contain Fe in their molecular structure as FeO or as in any state or states of oxidation lower than $Fe_2O_3$ fall into the class with which this invention is concerned.

Such minerals are:

Djalmaite, $(U, Ca, Pb, Bi, Fe)(Ta, Cb, Ti, Zr)_3O_9 \cdot nH_2O$
Yttrotantalite, $(Fe, Y, Ca, \text{etc.})(Cb, Ta, Za, Sn)O_4$
Yttro-columbite (more Cb than above)
Nohlite, $(Ca, Mg, Fe, Y, \text{etc. } U)_2(Cb, Zr, Fe)_3O_{10}$
Eschynite, $(Ce, Ca, Fe, Th)(TiCb)_2O_6$
Priorite, $(Y, Er, Ca, Fe, Th)(Ti, Cb)_2O_6$
Samarskite, $(Y, Er, Ce, U, Ca, Fe, Pb, Th)(Cb, Ta, Ti, Sn)_2O_6$
Fergusonite, $(Y, Er, Ce, Fe)(Ta, Cb, Ti)O_4$
Columbo-tantalite $(Fe, Mn)(Cb, Ta)_2O_6$
Polymignite, $(Ca, Fe, Y, \text{etc.}, Zr, Th)(Cb, Ti, Ta)O$
Zirkelite, $(Ca, Fe, Th, U)_2 \cdot (Ti, Zr)_2O_5$
Brannerite, $(U, Ca, Fe, Y, Th)_3 \cdot Ti_5O_{16}$
Ampangabeite, $(Y, Er, U, CaTh)_2 \cdot (Cb, Ta, Fe, Ti)_7O_{16}$
Allanite, $4(Ca, Fe)O \cdot 3(Al, Ce, Fe, Di)_2O_3 \cdot 6SiO_2 \cdot H_2O$
Knopite, $(Ca, Y, Fe, Ce)O \cdot TiO_2$
Aenigmatite, a titano-silicate of columbium and iron
Magnesium-orthite, $7\{(Mg, Fe, Ca)O + (Fe, Al, Ce, Cb, La)_2O_3\}6SiO_2 \cdot H_2O + F$
Eudialyte, $Na_2O \cdot Ce_2O_3 \cdot FeO \cdot MnO \cdot Zr_2O_3 \cdot SiO_2$
Codazzite, $(Ca, Mg, Fe, Ce)CO_3$ Heretofore, these minerals have been regarded as quite resistant to decomposition and none of the components incorporated in the molecular structure have been deemed extractable unless total decomposition was accomplished by prolonged digestion in expensive concentrated solvents, in some cases after costly prior fusion, usually at elevated temperatures and/or with a pressure of many atmospheres. The molecular structure has been regarded as not susceptible to such re-arrangement that a part of the molecule could be subtracted while the rest of the molecule remained substantially unaffected.

In my improved process, when treating minerals which have FeO present in the molecule of the mineral, it is possible to, in some instances, preferentially extract the iron and leave the more valuable constituent, and in the other instances, to preferentially extract the iron together with the most valuable constituents leaving behind the valueless constituents substantially unattacked. In the latter instance, leaving the valueless constituents unattacked means, of course, a savings in reagent consumption and a lesser degree of contamination in the primary concentration of the valuable constituents.

The FeO in all the above named minerals is not directly extractable by leaching with economical solvents because in each case, it is protected by the constituents forming the rest of the molecule. For the FeO to become susceptible to preferential leaching, it is not only necessary to free it from the protection exerted by the natural lattice of the molecule, but also to free it in a readily soluble form. $Fe_3O_4$ is readily soluble but the FeO radical cannot be oxidized directly to $Fe_3O_4$ because the FeO insistently seeks the highest common state of oxidation, $Fe_2O_3$. I have found that in all minerals available for testwork which contain an FeO radical (a radical being a group of atoms which behave as an entity) the FeO is readily oxidizable to $Fe_2O_3$ by roasting in an oxidizing atmosphere at the normal temperatures used for conversion of iron compounds to $Fe_2O_3$, that is, at approximately 700 deg. C., the refractory characteristics toward reduction or solubility of the original mineral notwithstanding. Then, when this is followed by a strongly reducing roast, such as one performed in a carbon monoxide or hydrogen atmosphere at 900–1260 deg. C., the $Fe_2O_3$, totally or in part, is readily reduced to $Fe_3O_4$ or in some cases, partly to $Fe_3O_4$ and partly to FeO. A part of the iron, essentially that part which is reduced to $Fe_3O_4$ is freed from the original molecule by such reduction and is available for leaching as unprotected iron open to attack by solvents. The solvents necessary to dissolve this iron can be any of the solvents in quite dilute form that are customarily used to dissolve finely divided magnetite, $Fe_3O_4$. Special conditions such as elevated temperatures, extremely fine grinding or pressure leaching is not essential and in some cases, undesirable, since such extreme measures will, in some instances, cause undue solution of that fraction which is desired to be left unattacked.

The chemical changes that take place during the oxidation and reduction steps that are responsible for re-arrangement of the molecule and for leaving the iron vulnerable to attack by solvents are easily demonstrated by taking chromite as an example. The formula for the chromite molecule may be written as $FeO \cdot Cr_2O_3$. The magnesium and aluminum contained therein will be disregarded since they play absolutely no part in the reactions at any time. Faulty reasoning is shown by attempts to reduce the FeO to Fe since the Fe will still be protected in the chromite molecule against acid attack unless very fine grinding and hot pressure leaching is resorted to with concomitant losses of chromium. The FeO cannot be oxidized directly to acid soluble $Fe_3O_4$ since it cannot be effectively prevented from going directly to the highest common state of oxidation, $Fe_2O_3$. If it were possible to oxidize the FeO directly to $Fe_3O_4$, the iron would still be protected from acid attack because although the formula for the molecule would be changed to $Fe_3O_4 \cdot 3Cr_2O_3$, no iron has actually been set free from the molecule, and but little iron can be leached out unless hot pressure leaching with strong solvents is applied which invariably entails considerable solution and loss of chromium. If the FeO radical is first oxidized to $Fe_2O_3$, then the chromite formula becomes $Fe_2O_3 \cdot 2Cr_2O_3$, in which each iron radical is coupled with two chromic oxide radicals. I have found that when this new arrangement has been obtained, by oxidation, the Fe-bearing radical can be reduced to lower states of oxidation, and that the chromic oxide radicals will be chemically satisfied with the new arrangement of one Fe-bearing radical to two Cr-bearing radicals even if the number of Fe atoms in the Fe radical are reduced in number. Thus, chromite, $FeO \cdot Cr_2O_3$, can be oxidized to $Fe_2O_3 \cdot 2Cr_2O_3$ as $$12(FeO \cdot Cr_2O_3) + 3O_2 = 6Fe_2O_3 \cdot 12Cr_2O_3.$$

Each Fe radical now is coupled with two Cr radicals.

Then $6Fe_2O_3 \cdot 12Cr_2O_3$ can be reduced to $$2Fe_3O_4 + 6FeO \cdot 12Cr_2O_3$$

as $$6Fe_2O_3 \cdot 12Cr_2O_3 + 4CO = 2Fe_3O_4 + 6FeO \cdot 12Cr_2O_3 + 4CO_2$$

Half of the original iron content is now in the form of magnetite, $Fe_3O_4$, in a finely-divided condition, free from the chromite molecule. It is readily available for leaching and will leach out completely in a very short time with dilute solvents at air temperature, at atmospheric pressure and without fine grinding. I have found, by examination of reduced calcines under the microscope, that there is considerable physical migration of iron during the reduction roasting. Examination of the reduced particles discloses many brownish crusty lines apparently delineating the exposed edges of parting planes, together with a number of roughly circular brownish patches. After leaching, the brownish lines and patches have disappeared, leaving in their place, open crevices and minute craters. I have found that as much as half of the original iron content can be leached out of the chromite which has been crushed to minus ten mesh size, oxidized by roasting in an oxidizing atmosphere at approximately 700 deg. C. for 3 hours, reduced by mixing with 20% of its own weight of minus ten mesh ordinary low-grade coal and roasting the mixture at approximately 1200 deg. C. for four hours, and leached for as little as 20 minutes with 10% sulphuric acid or by a 6% $SO_2$ gas in water solution; furthermore, that this can be done at air temperature, at atmospheric pressure, and without any mechanical reduction in particle size between any of the several steps of the process, with only trace or negligible amounts of chromium going into solution. This nearly 100% recovery of chromite is important to the beneficiation because, beyond avoiding a charge for non-recovery, it means that the total degree of iron removal accrues to the benefit of improved Cr:Fe ratio.

I prefer to allow three hours for the oxidizing roast, maintaining the temperature at approximately 700 deg. C. with constant rabbling of the charge in order to insure free access of air to all particles. Particles that will pass through a ten mesh screen are sufficiently fine for effective oxidation, reduction and leaching. Test runs made on chromite that was 100% plus ten mesh and 100% minus one-fourth inch resulted in about half as much iron being removed as duplicate tests made on minus ten mesh material. Subsequent investigation showed that poorer results on the plus ten mesh sample were attributable to less effective oxidation primarily, less effective reduction secondarily, and that the coarse sizes hindered leaching to only a small extent.

A sample of minus ten mesh chromite gravity concentrate marked "Lumnec Chromite Conc." was assayed and found to contain 28.28% Cr, 12.42% Fe, 2.45% $SiO_2$ and had a Cr:Fe ratio of 2.28:1. Approximately one kilo of this chromite was oxidized by hand-rabbling on an iron plate on top of a butane-fired furnace at approximately 700 deg. C. for 3 hours. At the end of the oxidation period, the charge was allowed to cool, then was mixed with 20% of its own weight of minus ten mesh low-grade coal and was poured loosely into a 3″ x 14″ fire-clay tube. One end of the tube was plugged and one end was partially restricted, leaving a small opening for gas escape. The charge was reduced in the butane furnace for four hours at 1200 deg. C. At the end of the reduction period, the charge was quenched in water, washed free of unconsumed coal, dried and weighed. The reduced product was very magnetic to a hand magnet, and the slight increase in weight indicated that reduction had been to magnetite rather than to elemental Fe. 100 grams of this minus ten mesh reduced calcine was leached by rolling in a bottle for 20 minutes with 500 cc. of 10% (by volume) sulphuric acid. The filtered, washed, and dried residue assayed 30.27% Cr and 8.97% Fe, showing a Cr:Fe ratio of 3.37:1. An assay of the filtrate for Cr disclosed that only 0.08% of the original Cr had gone into solution.

Several formulae are commonly ascribed to minerals known as "ilmenite." These are:

(1) $FeO \cdot Fe_2O_3 \cdot 3TiO_2$
(2) $FeO \cdot TiO_2$
(3) $Fe_3O_4 \cdot 3TiO_2$ No. 1 should be very slightly magnetic to a hand magnet, No. 2, the formula most commonly encountered, should be slightly magnetic, and No. 3 should be very magnetic to a hand magnet. It should be easily possible to oxidize by an oxidizing roast at 700 deg. C., any form of true ilmenite to a new molecular structure in which the iron is present as $Fe_2O_3$ as—

(No. 1)  $4(FeO \cdot Fe_2O_3 \cdot 3TiO_2) + O_2 = 6Fe_2O_3 \cdot 12TiO_2$
(No. 2)  $4(FeO \cdot TiO_2) + O_2 = 2Fe_2O_3 \cdot 4TiO_2$
(No. 3)  $4(Fe_3O_4 \cdot 3TiO_2) + O_2 = 6Fe_2O_3 \cdot 12TiO_2$ In this oxidized product, we have a new condition similar to that created by oxidizing chromite; here, each iron radical is now coupled with two titanium radicals. I have found that the oxidized iron radical can only be preferentially reduced to $Fe_3O_4$ and metallic Fe as $$6Fe_2O_3 \cdot 12TiO_2 + 4CO = 2Fe_3O_4 + 6FeO \cdot 12TiO_2 + 4CO_2$$

and $$Fe_3O_4 + 4CO = 3Fe + 4CO_2$$

There is evidently a substantially measurable amount of iron reduced to metallic Fe since the reduced product is extremely magnetic, more so than would be expected of an equivalent amount of iron present as magnetite, since the loss of weight during the reduction is greater than could be accounted for by reduction of $Fe_2O_3$ to $Fe_3O_4$, and since the reduced product releases its iron more readily to reagents adapted to metallic Fe solution than it does to solvents ordinarily used for $Fe_3O_4$ solution.

Another reaction possible during the reduction is:

$$6Fe_2O_3 \cdot 12TiO_2 + 2CO = 4Fe_3O_4 \cdot 12TiO_2 + 2CO_2$$

and $$4Fe_3O_4 \cdot 12TiO_2 + 12CO = 8Fe + 4FeO \cdot 12TiO_2 + 12CO_2$$

This reaction indicates that two-thirds of the original iron will be in free elemental form. Since tests have shown that approximately two-thirds of the iron does become acid-soluble, and since the reduced product exhibits such marked magnetic susceptibility, this is the reaction that is believed to indicate the greater part of the chemical change during reduction. Tests have disclosed that removal of approximately two-thirds of the iron is not prejudicial to repeating the process and making a further extraction of iron from the remaining one-third of the original iron content.

A sample of minus ten mesh ilmenite concentrate recovered by gravity concentration methods from beach sands on the island of Palawan, Republic of the Philippines and cleaned of contaminants by repeated passes through an induced-roll magnetic separator was found by assay to contain 49.95% $TiO_2$ and 27.72% Fe. The sample was oxidized for three hours at 700 deg. C. with constant hand-rabbling on an iron plate on top of a butane-fired furnace. At the end of the three hour oxidation period the charge was allowed to cool and was mixed with 200% of its own weight of minus ten mesh coal. The mixture was poured loosely into two 30-gram fire-clay crucibles and reduced at 1260 deg. C. for 4 hours. At the end of the reduction period, the charges were quenched in water, washed free of unconsumed coal and dried. Twenty-five grams of reduced calcine was then leached, at ten mesh size, for 20 minutes with 10% (by volume) sulphuric acid at air temperature and at atmospheric pressure. The filtered, washed and dried residue assayed 64.41% $TiO_2$, 13.86% Fe and weighed 19.0 grams, showing a recovery in residue of 98.0% of the $TiO_2$ and only 38% of the Fe. The 19 grams of residue, less the small quantity taken out for assay purposes was re-oxidized, re-reduced and re-leached as before. The filtered, washed and dried residue from the second leaching weighed 12.5 grams and assayed 6.65% Fe and 75.84% $TiO_2$ and showed a $TiO_2$ recovery in the residue of 98% while that of the iron was 40%.

A small sample of minus ten mesh ferberite, said to have originated in the Republic of Korea and assaying 73.01% $WO_3$ and 18.40% Fe with small amount of Mn, $SiO_2$ and CaO was roasted for 3 hours at 750 deg. C. with free access of air and constant hand-rabbling. At the end of the oxidation period the charge was allowed to cool and was then mixed with 15% of its own weight of low-grade bituminous coal. The mixture was poured into a 30-gram fire-clay crucible, covered with a loose fitting porcelain cover and reduced in the butane furnace at 1260 deg. C. for four hours. At the end of the four hour reduction period, the charge was quenched in water, washed free of unconsumed coal and dried. 10 grams of the reduced calcine was leached for 3 hours with 30% (by volume) sulphuric acid at air temperature and at atmospheric pressure without further grinding. At the end of the three-hour leaching period, the leached calcines were filtered, washed, dried and weighed. Leaching was found to have caused a loss in weight of 1.2 grams or 12% of the original. The clean residue assayed 83.00% $WO_3$ and 12.55% Fe. No $WO_3$ was lost by leaching but a very small amount of free yellow $WO_3$ was seen as very fine crystals in the residue.

There are many minerals which contain the rare earths such as cerium, lanthanum, prasedymium, neodymium, etc., and/or columbium, tantalum, thorium, and/or uranium. Practically all of these minerals are very complex and quite refractory to attack both to heat treatment and to acid attack. The usual method of attack is by total fusion with an expensive amount of alkaline reagents. I have found that when any of these minerals contains the FeO radical in its formula, the FeO can be oxidized to $Fe_2O_3$ as described above, reduced to $Fe_3O_4$ as described, and then successfully leached with dilute sulphuric acid at air temperature and without grinding to extremely fine sizes. The iron can be caused to go into solution accompanied by a satisfactorily complete percentage of the contained rare earths and/or columbium, tantalum, thorium and/or uranium. Silica and alumina are left behind unattacked, as are zirconium and titanium when present. The solute contains essentially the valuable constituents along with the iron, which can then be separated by conventional means. The disclosure here is not pretended to extend beyond provision of an economical means of putting the valuable constituents of such minerals into solution.

I do not intend to convey that tests have been made on all the minerals listed below, but because of the similarity of the molecular structure of all these minerals, it is clearly evident that disclosure of a method of economical attack on some of them constitutes a disclosure of a method applicable to all of them.

Some of the minerals in this class are—

Djalmaite, (U, Ca, Pb, Bi, Fe)(Ta, Cb, Ti, Zr)$_3$O$_9 \cdot n$H$_2$O
Yttrotantalite, (Fe, Y, U, Ca, etc.)(Cb, Ta, Zr, Sn)O$_4$
Yttro-columbite—more Cb than the above
Nohlite, (Ca, Mg, Fe, Y, etc., U)$_2$(Cb, Zr, Fe)$_3$O$_{10}$
Eschynite, (Ce, Ca, Fe, Th)(Ti, Cb)$_2$O$_6$
Priorite, (Y, Er, Ca, Fe, Th)(Ti, Cb)$_2$O$_6$
Samarskite, (Y, Er, Ce, U, Ca, Fe, Pb, Th)(Cb, Ta, Ti, Sn)$_2$O$_6$
Fergusonite, (Y, Er, Ce, Fe)(Ta, Cb, Ti)O$_4$
Columbo-tantalite, (Fe, Mn)(Cb, Ta)$_2$O$_6$
Polymignite, (Ca, Fe, Y, etc., Zr, Th)(Cb, Ti, Ta)O
Zirkelite, (Ca, Fe, Th, U)$_2$(Ti, Zr)$_2$O$_5$
Brannerite, (U, Ca, Fe, Y, Th)$_3 \cdot$Ti$_5$O$_{16}$
Ampangabeite, (Y, Er, U, Ca, Th)$_2 \cdot$(Cb, Ta, Fe, Ti)$_7$O$_{16}$
Knopite, (Ca, Y, Fe, Ce)O.TiO$_2$
Aenigmatite—titano-silicate of columbium and iron Hellandite, $3(Al, Fe, Mn, Ce)_2O_3 \cdot 2CaO \cdot 4SiO_2 \cdot 3H_2O$
Magnesium-orthite, $7[(Mg, Fe, Ca)O + (Fe, Al, Ce, Cb, La)_2O_3]6SiO_2 \cdot H_2O + F$
Eudialyte, $Na_2O \cdot Ce_2O_3 \cdot FeO \cdot MnO \cdot Zr_2O_3 \cdot SiO_2$
Codazzite, $(Ca, Mg, Fe, Ce)CO_3$
Allanite, $4(Ca, Fe)O \cdot 3(Al, Ce, Fe, Di)_2O_3 \cdot 6SiO_2 \cdot H_2O$ A sample of a minus ten mesh variety of allanite, concentrated by gravity methods from beach sands on the Island of Palawan, was found to be infusible and unattacked by ordinary acids under any conditions. This allanite concentrate assayed 21.5% rare earth oxides, 1.5% thoria, 8.82% Fe, 16.06% $Al_2O_3$ and 31.00% $SiO_2$.

One kilo of this minus ten mesh allanite was oxidized by roasting for three hours on an iron plate on top of a butane-fired furnace with free access of air and constant hand-rabbling. At the end of the oxidation period, the charge was allowed to cool and was then mixed with 20% of its own weight of minus ten mesh coal. The mixture was poured loosely into a 3" by 14" fire-clay tube, whose lower end was plugged with refractory cement. The upper end was left open. The charge was reduced for four hours at 1200 deg. C. At the end of the reduction period, the charge was quenched in water, washed free of unconsumed coal and dried.

50 grams of the reduced allanite was leached by rolling in a bottle for 16 hours with 10% (by volume) sulphuric acid. At the end of the leaching period the charge was filtered, and the residue was well-washed. Assay of the products disclosed that, of the rare earths, 74% was in the filtrate and 26% was in the residue. Thoria recovery was 76% in filtrate, and 24% in residue. Iron was 65% in filtrate and 35% in residue. Calcium was almost 100% in filtrate while alumina and silica were almost 100% recovered in residue. Further experimental work will doubtlessly lead to better rare earth and thoria recovery in filtrate. If it does become evident that complete recovery can only come from fusion of the residue with suitable reagents, the tonnage necessitating such treatment will have been greatly reduced. Because of the similarity of the molecular structure of the rare-earth and/or columbium, tantalum, thorium and/or uranium-bearing minerals which contain an FeO radical in such molecular structure, it is evident that disclosure of a method for economical attack on one constitutes disclosure of a method applicable to all.

What is claimed is:

1. A process of upgrading a mineral ore containing FeO as one constituent and as a second constituent the oxide of another metal having an initial metal:Fe ratio of less than 3:1 to a metallurgical grade ore having a final metal:Fe ratio of more than 3:1, and wherein said FeO and other metal oxide in both the initial ore and the metallurgical grade ore are molecularly bonded radicals, comprising the steps of comminuting the ore, heating the comminuted ore at a preferred temperature range of about 700° to 750° centigrade under oxidizing conditions while controlling the degree of comminution, the heating temperature and the oxidizing conditions so as to convert at least a portion of said FeO to an $Fe_2O_3$ radical in the iron oxide-metal oxide molecule, whereby the ratio of iron oxide radicals to said metal oxide radicals in said molecule is decreased, reducing said oxidized ore at a preferred temperature range of about 1200° to 1260° centigrade to convert at least a portion of said $Fe_2O_3$ radical to FeO in the iron oxide-metal oxide molecule and liberating uncombined $Fe_3O_4$ while leaving the metal oxide substantially unchanged, whereby the ratio of iron to said metal in said molecule is decreased, and extracting at least a portion of said uncombined $Fe_3O_4$ with a chemical reagent reactive therewith, whereby the ratio of said metal to iron in said ore is increased.

2. A process as set forth in claim 1, wherein said reduction is conducted in an atmosphere of carbon monoxide.

3. A process of upgrading a tungsten mineral ore containing molecularly bonded FeO and $WO_3$ radicals, comprising the steps of oxidizing at least a portion of said FeO radicals to $Fe_2O_3$ radicals in the iron oxide-tungsten oxide molecular structure by roasting the ore for approximately three hours at a temperature of about 750 degrees centigrade with free access of air, whereby the ratio of iron oxide radicals to tungsten oxide radicals in said molecular structure is decreased, reducing at least a portion of said $Fe_2O_3$ radicals to FeO radicals in said molecular structure and liberating uncombined $Fe_3O_4$ and Fe by mixing the roasted product with about 15% of its weight of granulated coal and roasting in the absence of air for about four hours at approximately 1260 degrees centigrade, and leaching the resultant product with dilute sulfuric acid to dissolve out uncombined Fe and $Fe_3O_4$.

4. A process as set forth in claim 3, wherein said mineral ore is ferberite.

References Cited in the file of this patent

UNITED STATES PATENTS

| 153,573 | Kidwell | July 28, 1874 |
| 1,196,049 | Rauschenplat | Aug. 29, 1916 |
| 1,360,666 | Mills | Nov. 30, 1920 |
| 1,403,237 | Eustis | Jan. 10, 1922 |
| 2,123,240 | Hammarberg | July 12, 1938 |